United States Patent
Lippert et al.

[11] Patent Number: 5,876,471
[45] Date of Patent: Mar. 2, 1999

[54] FILTER HOLDER AND GASKET ASSEMBLY FOR CANDLE OR TUBE FILTERS

[75] Inventors: Thomas Edwin Lippert, Murrysville; Mary Anne Alvin, Pittsburgh; Gerald Joseph Bruck, Murrysville; Eugene E. Smeltzer, Export, all of Pa.

[73] Assignee: Siemens Westinghouse Power Corporation, Orlando, Fla.

[21] Appl. No.: 636,432

[22] Filed: Apr. 23, 1996

[51] Int. Cl.[6] .................................................. B01D 29/13
[52] U.S. Cl. .......................... 55/341.1; 55/378; 55/484; 55/502; 55/508; 55/523
[58] Field of Search .............................. 55/498, 523, 378, 55/379, 505, 508, 484, 341.1, 502; 285/177

[56] References Cited

U.S. PATENT DOCUMENTS

| | | | |
|---|---|---|---|
| 4,156,533 | 5/1979 | Close et al. | 272/229 |
| 4,539,025 | 9/1985 | Ciliberti et al. | 55/302 |
| 4,735,635 | 4/1988 | Israelson et al. | 55/71 |
| 4,929,429 | 5/1990 | Merry | 422/179 |
| 5,143,530 | 9/1992 | Haldipur et al. | 55/341.1 |
| 5,212,948 | 5/1993 | Gillingham et al. | 55/466 |
| 5,433,771 | 7/1995 | Bachovchin et al. | 55/523 |
| 5,460,637 | 10/1995 | Connolly et al. | 55/523 |
| 5,474,586 | 12/1995 | Eaton et al. | 55/523 |

FOREIGN PATENT DOCUMENTS

| | | |
|---|---|---|
| 5803834 | 6/1988 | WIPO . |
| 9602314 | 2/1996 | WIPO . |

*Primary Examiner*—Jay H. Woo
*Assistant Examiner*—Robert Hopkins

[57] ABSTRACT

A filter holder and gasket assembly for holding a candle filter element within a hot gas cleanup system pressure vessel. The filter holder and gasket assembly includes a filter housing, an annular spacer ring securely attached within the filter housing, a gasket sock, a top gasket, a middle gasket and a cast nut.

12 Claims, 8 Drawing Sheets

FILTER HOLDER AND GASKET ASSEMBLY FOR CANDLE OR TUBE FILTERS

The Government of the United States of America has rights in the invention pursuant to Contract No. W-AEPSC C8014, awarded by the U.S. Department of Energy.

FIELD OF THE INVENTION

The present invention relates generally to hot-gas cleanup systems and more particularly to a filter holder and gasket assembly that provides a particulate barrier seal between the body of a candle filter element and the filter holder when coupled to a hot gas cleanup system support plate.

BACKGROUND OF THE INVENTION

Modern industrial methods have resulted in a need for an apparatus that is capable of efficiently filtering high temperature combustion gases containing particulate material. In combustion turbine applications, for example, a combustion turbine uses energy generated from hot pressurized combustion gases produced by burning natural or propane gas, petroleum distillates or low ash fuel oil. When coal and other solid fuels are burned, particulates carried over from the combustion of such solid fuels can cause turbine blade erosion and fouling. An efficient system for filtering of such hot combustion gases would permit the use of such solid fuels. As another example, in conventional boiler operations, the boilers undergo routine shutdown for cleaning the fireside surfaces and for inspection. An efficient hot gas filtering system would greatly extend the life and operational time for a boiler to operate between inspections. Fouling of the fireside surface due to ash deposition and corrosion would be eliminated or minimized.

It would be desirable to provide a filtering apparatus that can filter high temperature, high pressure, aggressive gases, such as oxidizing gases, and/or reducing gases.

Additionally, it would be desirable to provide an improved filter holder and gasket assembly that can be employed with a conventional candle filter and a thin walled composite filter which can more easily be mounted within a pressure vessel than prior art filter holder and gasket assemblies.

SUMMARY OF THE INVENTION

The present invention provides a filter holder and gasket assembly for coupling either a monolithic ceramic, composite candle, or tube filter to a support plate within a hot cleanup gas system pressure vessel. The filter holder and gasket assembly comprises a filter housing which has a peripheral sidewall that defines an interior chamber. A spacer ring is securely attached within the filter housing interior chamber. A plurality of gaskets are employed to provide cushioning and sealing around a filter element and the filter housing to prevent particulate matter from passing between the filter body and housing. A cast nut is provided to securely couple the assembled housing, filter element and gaskets.

BRIEF DESCRIPTION OF THE DRAWINGS

FIG. 5a is a sectional view of the filter element shown in FIG. 5 taken along section line 5a—5a;

DETAILED DESCRIPTION OF THE PREFERRED EMBODIMENT

Figure 1:
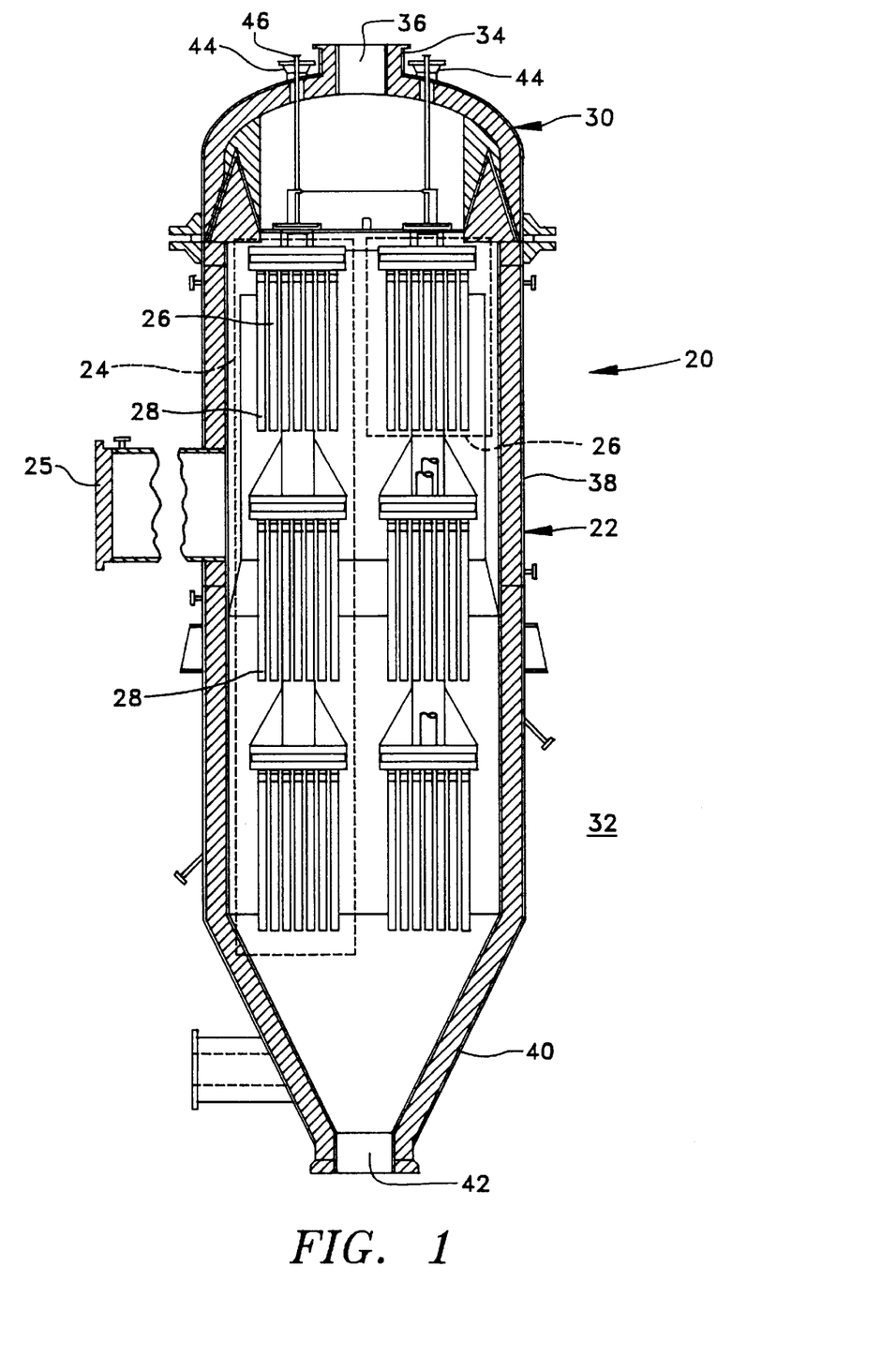
FIG. 1 is a longitudinal section view of a pressure vessel incorporating the filter holder and gasket assembly in accordance with the present invention.

FIG. 1 shows a filtering apparatus 20 for separating particulate matter from a gas stream. This apparatus includes a pressure vessel 22 in which there are mounted a plurality of clusters 24 comprising a plurality of filter element arrays 26. These filter element arrays 26 include a plurality of "candle filter elements" 28.

The pressure vessel 22 has a dome-shaped head 30 and a body 32. The dome-shaped head 30 terminates in a linear tip 34, defining an exit opening or nozzle 36 for the gas filtered to be removed from the vessel 22. The body 32 includes a dirty gas inlet 25, an upper part 38 having a generally circular cylindrical shape joined by a frusto conical ash hopper 40 for receiving the particulate matter terminating in a linear tip defining an opening or nozzle 42 connected to an ash discharge line. A plurality of ports 44 extend from the dome-shaped head 30. The ports 44 provide a site for inserting instrumentation and for viewing the interior of the dome-shaped head 30 during shut-down periods. Through each port, tubes 46 for supplying a back pulse burst of gas for cleaning the candle filters 28 are sealed.

Figure 2:
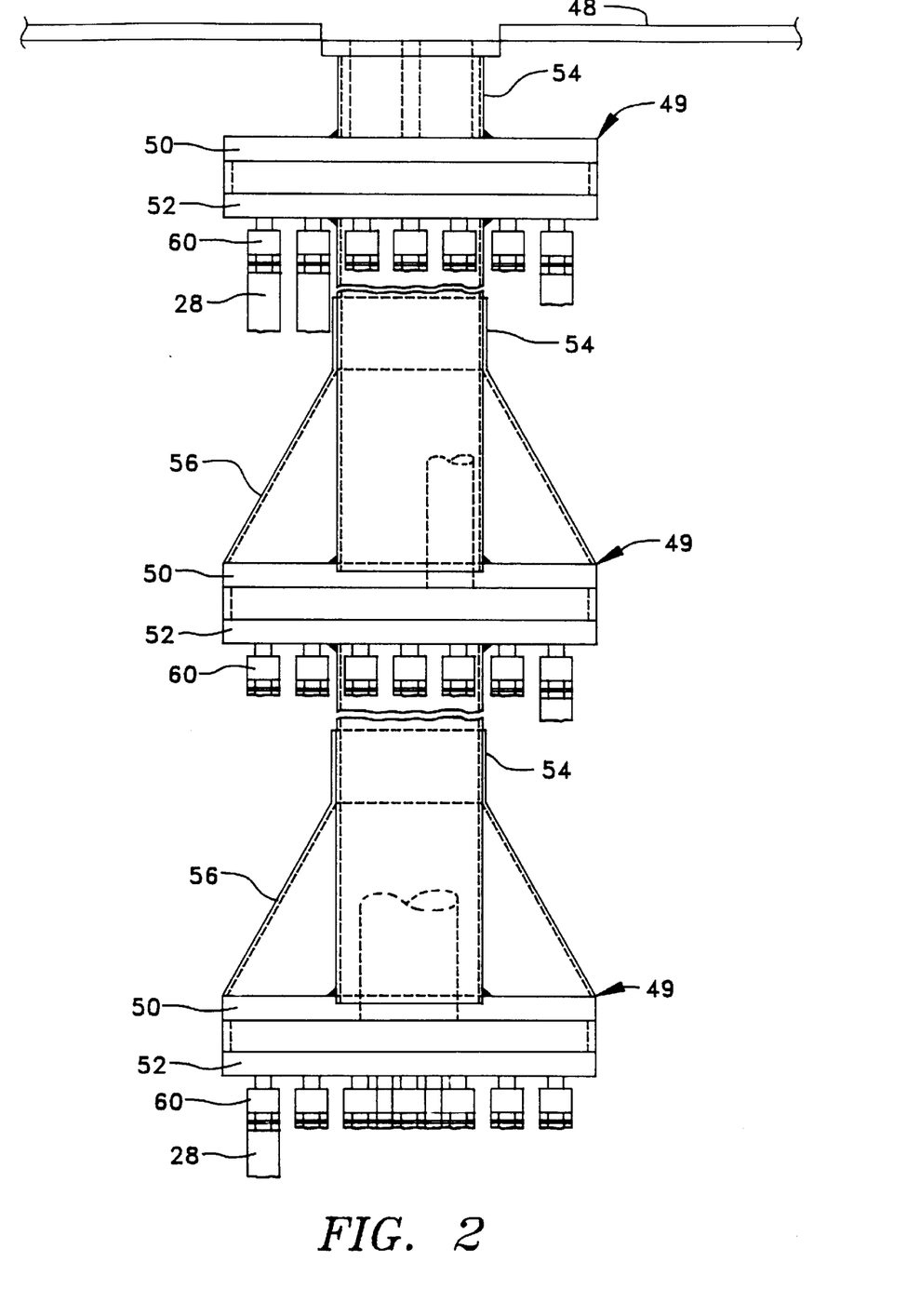
FIG. 2 is a side elevation view of an array of filter elements coupled to a tube sheet as shown in FIG. 1.

Referring to FIG. 2, the pressure vessel includes a tube sheet 48. Each tube sheet 48 comprises an upper plate 50 and a lower plate 52. In accordance with the present invention, each filter element 28 is held within a filter holder and gasket assembly 60 and coupled to the corresponding lower plate 52 of the tube sheet 48. The filter elements 28 are integrated into a structural unit by plenum support pipes 54. Each plenum support pipe 54 is secured centrally (coaxially) within the pressure vessel 22. A dust shed or particle-deflector 56 having a generally frusto-conical shape is attached above each tube sheet 48.

Figure 3:
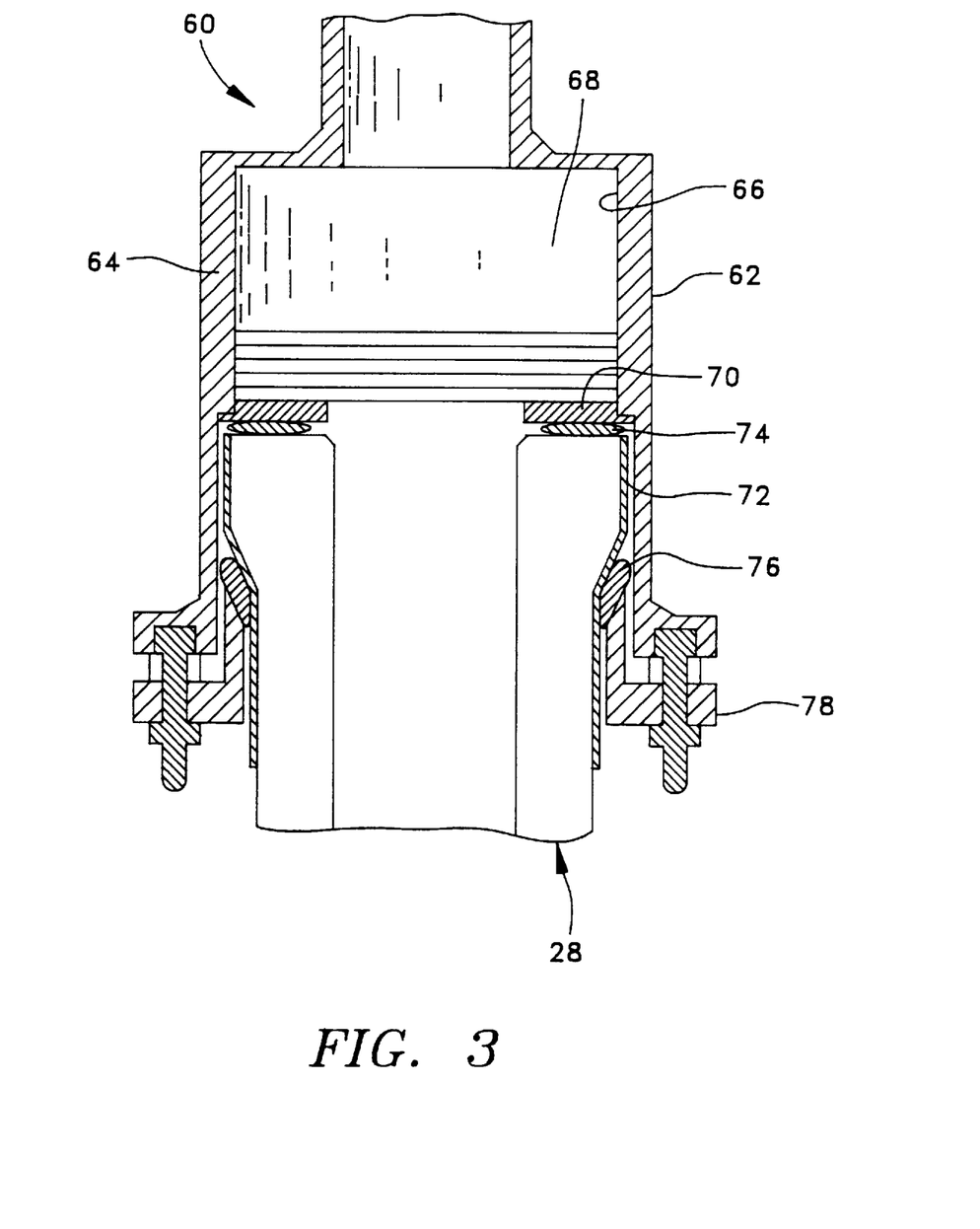
FIG. 3 is a sectional view of a filter holder and gasket assembly in accordance with the present invention employed with a conventional monolithic thick-walled hollow candle filter.
Figure 4:
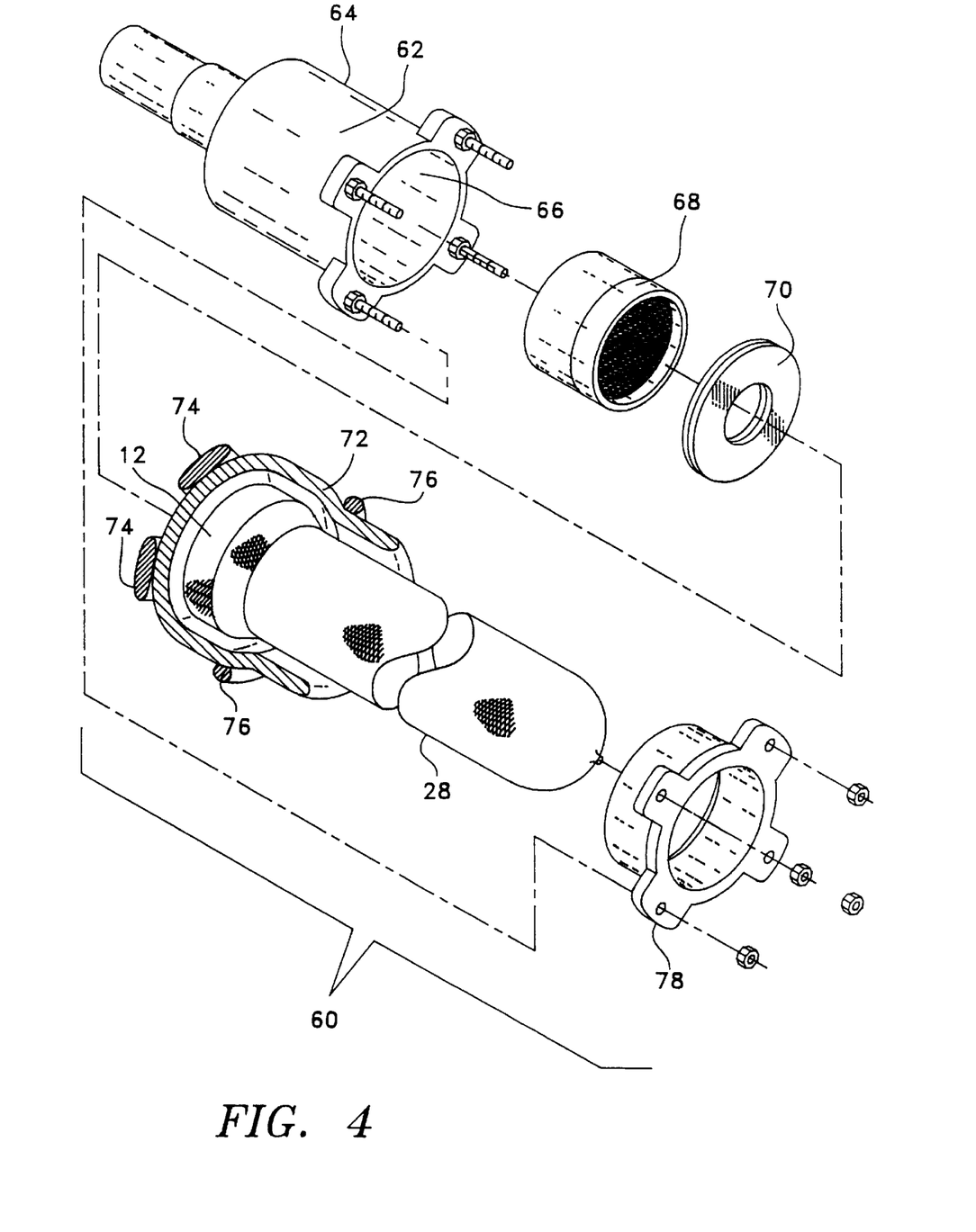
FIG. 4 is an exploded view of the filter holder and gasket assembly shown in FIG. 3.

The preferred filter holder and gasket assembly 60 of the present invention for use with a conventional thick-wall hollow tube monolithic ceramic candle filter 28, will now be described. Referring to FIGS. 3 and 4, the filter holder and gasket assembly 60 provides a particulate barrier seal between the clean gas and dirty gas surfaces of the filter element 28.

Referring to FIGS. 3 and 4, the filter holder and gasket assembly 60 is shown. The filter holder and gasket assembly 60 comprises a filter housing 62 having a peripheral sidewall 64 which defines an interior chamber 66, a fail-safe/regenerator device 68 permanently mounted, within the interior chamber 66, an annular spacer ring 70 permanently mounted, within the interior chamber 66, a gasket sock or sleeve 72, a top compliant gasket 74, a middle compliant gasket 76, and a cast nut 78. It is noted that the fail-safe/regenerator device 68 need not be a part of the assembly.

Preferably the spacer ring 70 is permanently mounted to the fail-safe/regenerator to produce a single unit that is placed within the interior chamber 66 of the filter housing. In this case, the spacer ring 70 may be welded in abutment with the fail-safe/regenerator device 68 to secure the fail-safe/regenerator 68 unit and to prevent the filter element 28 from moving and contacting the filter housing 62 thereby preventing possible damage to the filter element 28. When the fail-safe/regenerator device 68 is not incorporated with the present invention, then only the spacer ring 70 will be securely mounted within the filter holder interior chamber 66.

Alternatively, the fail-safe/regenerator device 68 may be removably mounted within the housing interior chamber 66 with the spacer ring 70 permanently mounted within the housing interior chamber 66.

The fail-safe/regenerator device 68 is provided to prevent particulate matter from travelling into the clean gas area of the pressure vessel if a filter element fails, is damaged or breaks. Additionally, the fail safe regenerator 68 will heat the back pulsed gas which is generally cooler than the gas stream to prevent the filter elements 28 from enduring thermal fatigue or cracking.

Figure 5:
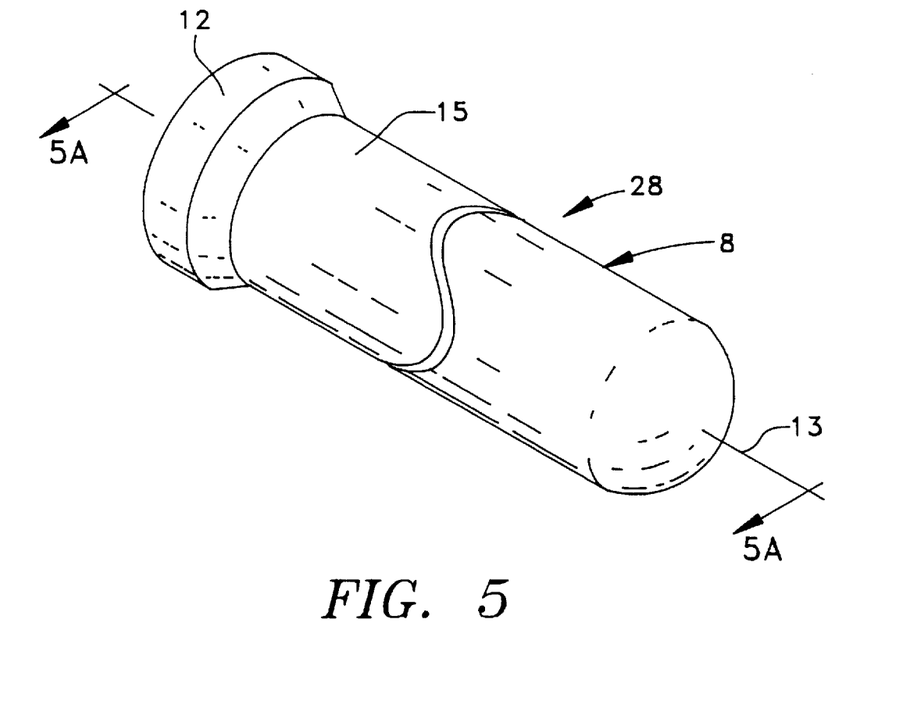
FIG. 5 is a perspective view of a conventional monolithic candle filter element.
Figure 5A:
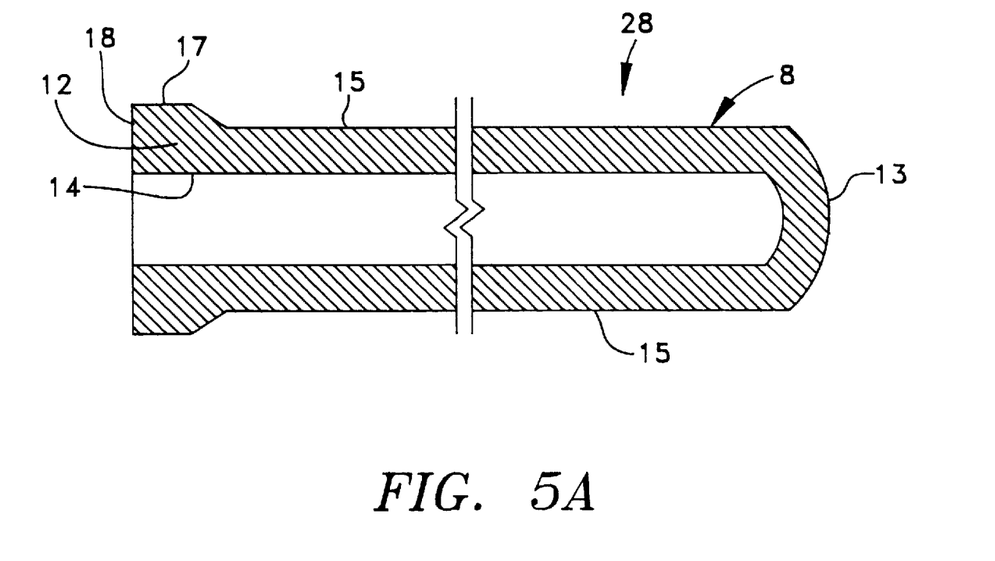

Referring to FIGS. 5 and 5a, a conventional thick-walled monolithic ceramic filter element 28 is shown. The monolithic ceramic filter element 28 has a hollow body 8 having two opposing ends, one end being a flange open end 12 and the other being a closed end 13. The body 8 has an inner diameter surface 14 and an outer diameter surface 15. The flange opened end 12 an outer surface 17 and a top surface 18. These filter elements typically have a body wall thickness between about 10.0 mm to about 15.0 mm and a flange wall thickness of about 22.0 mm.

The monolithic candle filter body 8 typically comprises an outside diameter of approximately 60 mm and an inside diameter that ranges from about 30 mm to about 44 mm.

The filter housing 62, annular spacer ring 70, and fail-safe/regenerator device 68 are made of a material that can withstand the relatively high temperatures that are reached in a particular system and possess the strength and durability to support the filtering components, preferably a high temperature metal material, such as 310 stainless steel.

The gaskets 72, 74, 76 are individual components that are separate and apart from the filter housing 62. The gaskets 72, 74, 76 are preferably made from high temperature ceramic fibers that are woven or braided into a desired pattern or shape, such as an annular gasket or circular sleeve. The shape and size of each gasket 72, 74, 76 must be large enough to be positioned on or around the candle filter 28 to provide an adequate particulate barrier seal to prevent gas leakage. More particularly, the sleeve or sock gasket 72 is preferably made of a woven or braided oxide fabric. The top gasket 74 and middle gasket 76 are preferably made of a braided or woven oxide based fabric that encases an oxide fiber, intermeshed, compliant mat.

The gasket sock or sleeve 72 is positioned around the outer surface of the filter flange 12 to provide a particulate matter barrier seal between the filter body 8 and the filter housing 62. The top compliant gasket 74 is positioned along the top surface 18 of the filter flange to provide a compliant cushion and particulate matter barrier seal between the spacer ring 70 and filter flange top 18. The middle compliant gasket 76 is positioned at the base of the filter flange 12 over the sleeve 72. The middle compliant gasket 76 provides a compliant cushion and particulate barrier seal between the filter body 8 and filter housing 62 and the cast nut 78. The assembled filter holder and gasket assembly 60 is then coupled to the tube sheet 52.

The preferred embodiment of the invention reduces the number of individual parts needed to assemble and seal the filter element 28 within the holder assembly 60. With the spacer ring 70 permanently mounted directly below the fail-safe device 68 or within the housing interior chamber 66, the time required for disassembling the housing for maintenance purposes and reassembling is decreased. In addition, the reduction of individual components reduces the potential for mis-assembly of the filter element 28 and gasket 74 thereby reducing the potential for gas leakage, and failure of the filter element 28.

Figure 6:
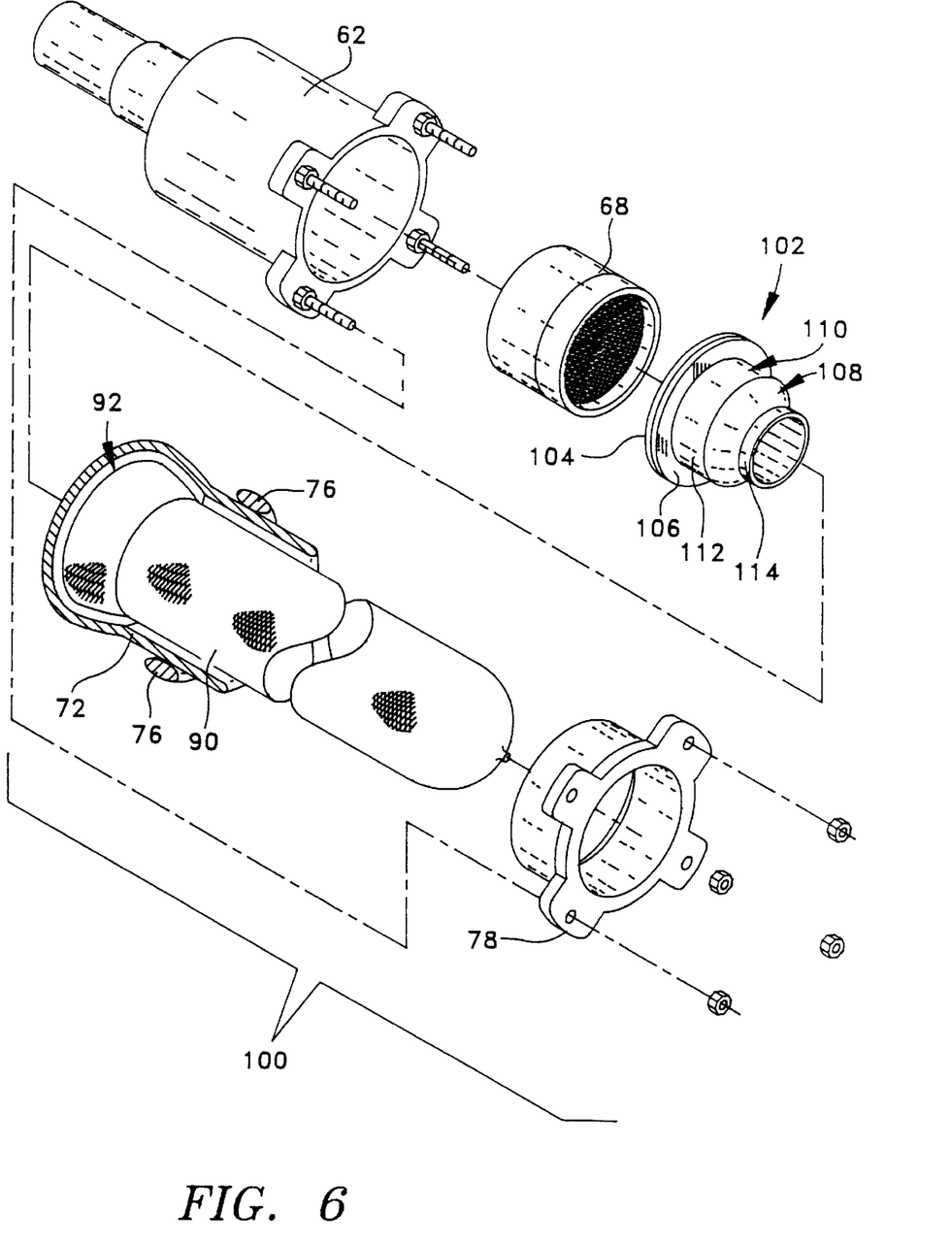
FIG. 6 is an exploded view of an alternative filter holder and gasket assembly employed with a thin-walled composite hollow candle filter.
Figure 7:
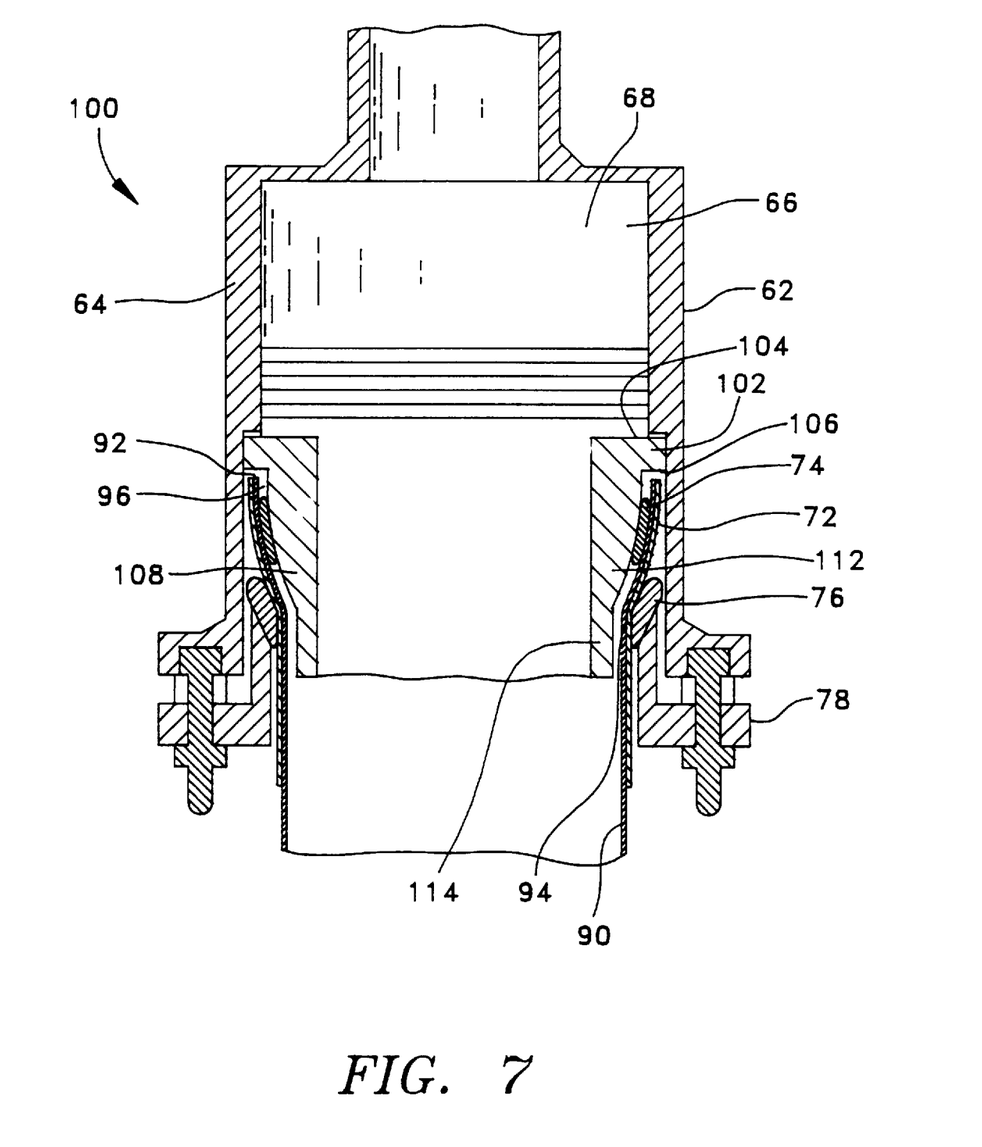
FIG. 7 is a sectional view of the filter holder and gasket assembly shown in FIG. 6.

Referring next to FIGS. 6 and 7, the preferred embodiment of the present invention employed with a thin walled composite candle filter 90, will be described. The filter holder and gasket assembly 100 comprises the same filter housing 62, fail-safe/regenerator device 68, gaskets 72, 74, 76, and cast nut 78 as that described above for the monolithic ceramic candle filter holder and gasket assembly 60. The annular spacer ring 102 is, however, designed differently than that employed with thick walled filter elements because of the different dimensions possessed by the thin wall composite filter 90.

Figure 8:
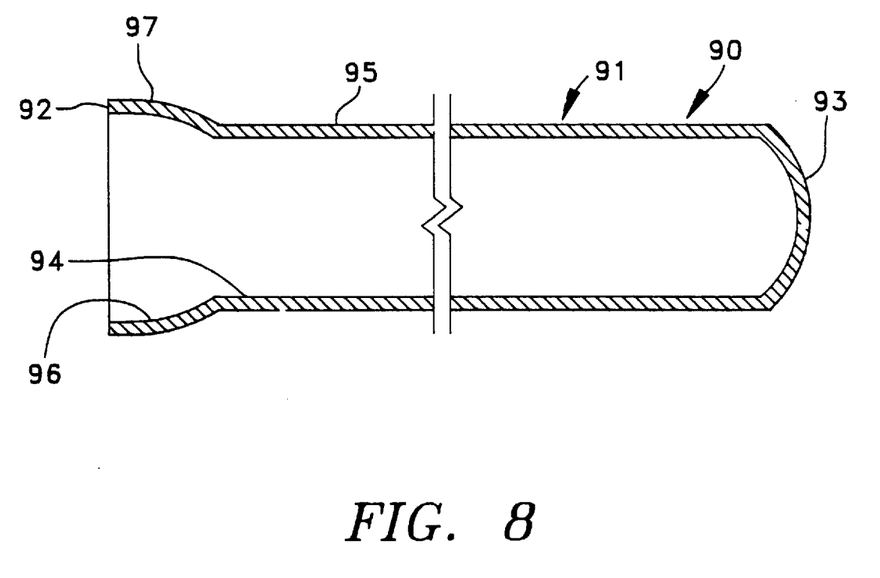
FIG. 8 is a sectional view of a thin wall composite filter element.

Referring to FIG. 8, a thin wall composite filter 90 is shown. The thin wall composite filter element 90 has a hollow body 91 having two opposing ends, one end being a flange open end 92 and the other being a closed end 93. The filter body 91 has an inner diameter surface 94 and an outer diameter surface 95. The flange opened end 92 has an inner surface 96 and outer surface 97.

Thin-wall composite filters are typically comprised of fibers and a ridgidized matrix made of SiC, aluminuma, or alumunate silicate. These filter elements have a reduced sidewall thickness ranging from about 1.0 mm to about 5.0 mm. The composite filter flange wall thickness and body are thinner than those of a conventional ceramic filter element flange.

The annular spacer ring 102, shown in FIGS. 7 and 8, is designed to be positioned within the thin walled composite filter flange 92 and a portion of the filter body inner diameter surface 94. The annular spacer ring 102 comprises a top surface 104, a bottom surface 106, and a transitional transducer 108 depending from the bottom surface 106. The transitional transducer 108 includes a continuous sidewall 110 having varying diameters that gradually decrease as the sidewall extends away from the bottom surface 106 such that the transducer sidewall 110 does not contact the filter flange inner surface 96 or the filter body inner surface 94 when placed adjacent to the filter element 90. Preferably, the continuous sidewall 110 has a stepped shaped sidewall having a large diameter outer surface 112 and a small diameter outer surface 114.

The transitional transducer large outer diameter surface 112 is formed slightly smaller than a thin walled candle filter flange inner diameter surface 96 such that the transitional transducer large outer diameter surface 112 will not come into contact with a candle filter flange inner surface 96 when fitted within the filter element 90. The transitional transducer small outer diameter surface 114 is formed slightly smaller than a thin walled candle body inner diameter surface 94 such that the transitional transducer small outer diameter surface 114 does not contact the filter candle body inner diameter surface 94.

Additionally, the gasket sock or sleeve 72, compliant gasket 74, and middle gasket 76 are designed to fit along and within a thin-walled composite filter flange area to provide a primary seals to prevent particulates to pass from the dirty side to the clean side. The gasket sleeve 72 is formed to be positioned around the flange outer surface 97 and a portion of the filter body outer surface 95 and to fill the space between the filter body 95 and the housing interior 66 and provide a seal therebetween. The compliant gasket 74 is formed to be positioned adjacent to the thin wall filter flange interior surface 96 and to provide a compliant cushion and particulate barrier seal between the filter flange inner surface 96 and space ring 102. The middle gasket 120 is formed to be positioned between the filter flange outer surface 97 and filter housing interior 66 to provide a particulate barrier seal between the filter flange outer surface 97 and filter housing interior 66.

The present invention may be embodied in other forms without departing from the spirit or essential attributes thereof, and accordingly, reference should be made to the appended claims, rather than to the foregoing specification, as indicating the scope of the invention.

We claim:

1. A filter holder and gasket assembly for holding a thick walled candle filter element within a hot gas cleanup system pressure vessel, the filter element including a body having a generally cylindrical portion and a flange portion; the flange portion having a top surface and an outer diameter surface; said filter holder assembly comprising:

a filter housing, said filter housing having a paripheral sidewall, said peripheral sidewall defining an interior chamber for receiving said flange portion of said filter element;

a generally annular spacer ring, said spacer ring positioned within said interior chamber;

at least one gasket sock formed to be positioned around the outer diameter surface of said flange portion to prevent contact between the outer diameter surface of the flange portion, and said filter housing;

at least one top gasket formed to be positioned on the top surface of said flange portion of the filter element for providing a seal between said spacer ring and the top surface;

at least one middle gasket formed to be positioned between said gasket sock and said filter housing sidewall to provide a seal between the filter body and said filter housing sidewall;

a nut for securing the filter element, the filter housing, and the top and middle gaskets within the pressure vessel; and said top gasket and said middle gasket each comprising an interior mat, said mat being made of a ceramic fibrous material; and a braided casing formed around said interior mat, said braided casing made of a flexible ceramic material.

2. The assembly of claim 1 wherein said spacer ring is welded within said interior chamber.

3. The assembly of claim 1 further comprising a fail-safe/regenerator device securely mounted within said interior chamber.

4. The assembly of claim 1 further comprising a fail-safe/regenerator device that is removably mounted above said spacer ring within said interior chamber.

5. The assembly of claim 3 wherein said fail-safe/regenerator device and said spacer ring are securely mounted together to form a single unit, said unit welded within said interior chamber.

6. A filter holder and gasket assembly for holding a thin-walled composite candle filter within a hot gas cleanup system pressure vessel, the filter element including a body having a generally cylindrical portion and a flange portion; the flange portion having an outer diameter surface and an inner diameter surface, said filter holder assembly comprising:

a filter housing, said filter housing having a peripheral sidewall, said peripheral sidewall defining an interior chamber for receiving said flange portion of said filter element;

a generally annular spacer ring, said spacer ring positioned within said interior chamber, said spacer ring including a top surface and a bottom surface, and a transitional transducer depending from said bottom surface, said transitional transducer including a continuous sidewall having varying diameters that gradually decrease as the sidewall extends in a direction away from the bottom surface, said diameters being formed such that the transducer sidewall will not contact the inner diameter surface of the filter flange;

at least one gasket sock formed to be positioned around the outer diameter surface of the flange portion to prevent contact between the outer diameter surface of the flange portion, and said filter housing;

at least one interior gasket formed to be positioned adjacent to the inner diameter surface of the flange portion to provide a seal between the inner diameter surface of the flange portion and the transitional transducer;

at least one middle gasket formed to be positioned between said gasket sock and said peripheral sidewall to provide a seal between the filter body and said peripheral sidewall; and a nut for securing the filter element, the filter housing and the interior and middle gaskets within the pressure vessel.

7. The assembly of claim 6 wherein said spacer ring is welded within said filter housing interior chamber.

8. The assembly of claim 6 wherein said spacer ring transitional transducer further comprises:

a generally step shaped side wall depending from said transducer bottom surface, said sidewall having a large outer diameter surface and a small outer diameter surface, said transitional transducer large outer diameter surface being slightly smaller than the inner diameter surface of the flange portion such that the large outer diameter surface of the transitional transducer will not contact the inner diameter surface of the flange portion, said transitional transducer small outer diameter surface being slightly smaller than the inner diameter surface of the filter body such that the small outer diameter surface of the transitional transducer does not contact the inner diameter surface of the filter body.

9. The assembly of claim 6 further comprising a fail-safe/regenerator device, wherein said fail-safe/regenerator device and said spacer ring are securely mounted together to form a single unit, said unit welded within said interior chamber.

10. The assembly in claim 6 further comprising a fail-safe/regenerator device that is removably mounted within said interior chamber.

11. The assembly of claim 6 wherein said interior gasket and middle gasket are compliant cushions and seals.

12. The assembly in claim 6 wherein the interior and middle gaskets each comprise an interior mat, said mat being made of a complaint ceramic fibrous material; and a braided casing formed around said interior mat, said braided casing made of a flexible ceramic material.

* * * * *